July 13, 1965 R. W. MANDERBACH 3,194,392
VIBRATORY FEEDER AND STORAGE DEVICE
Filed March 27, 1963 2 Sheets-Sheet 1
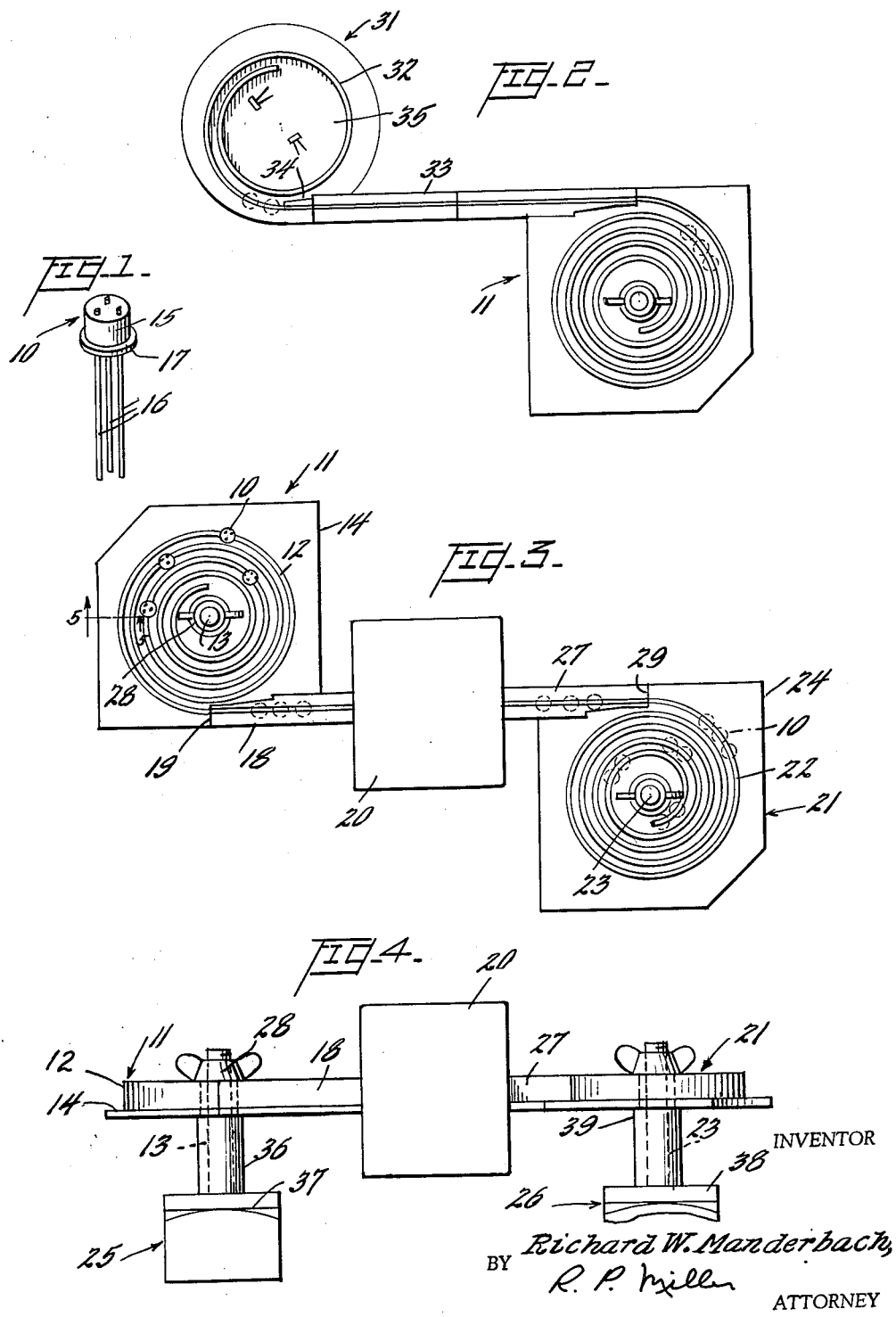
INVENTOR
Richard W. Manderbach,
BY R. P. Miller
ATTORNEY

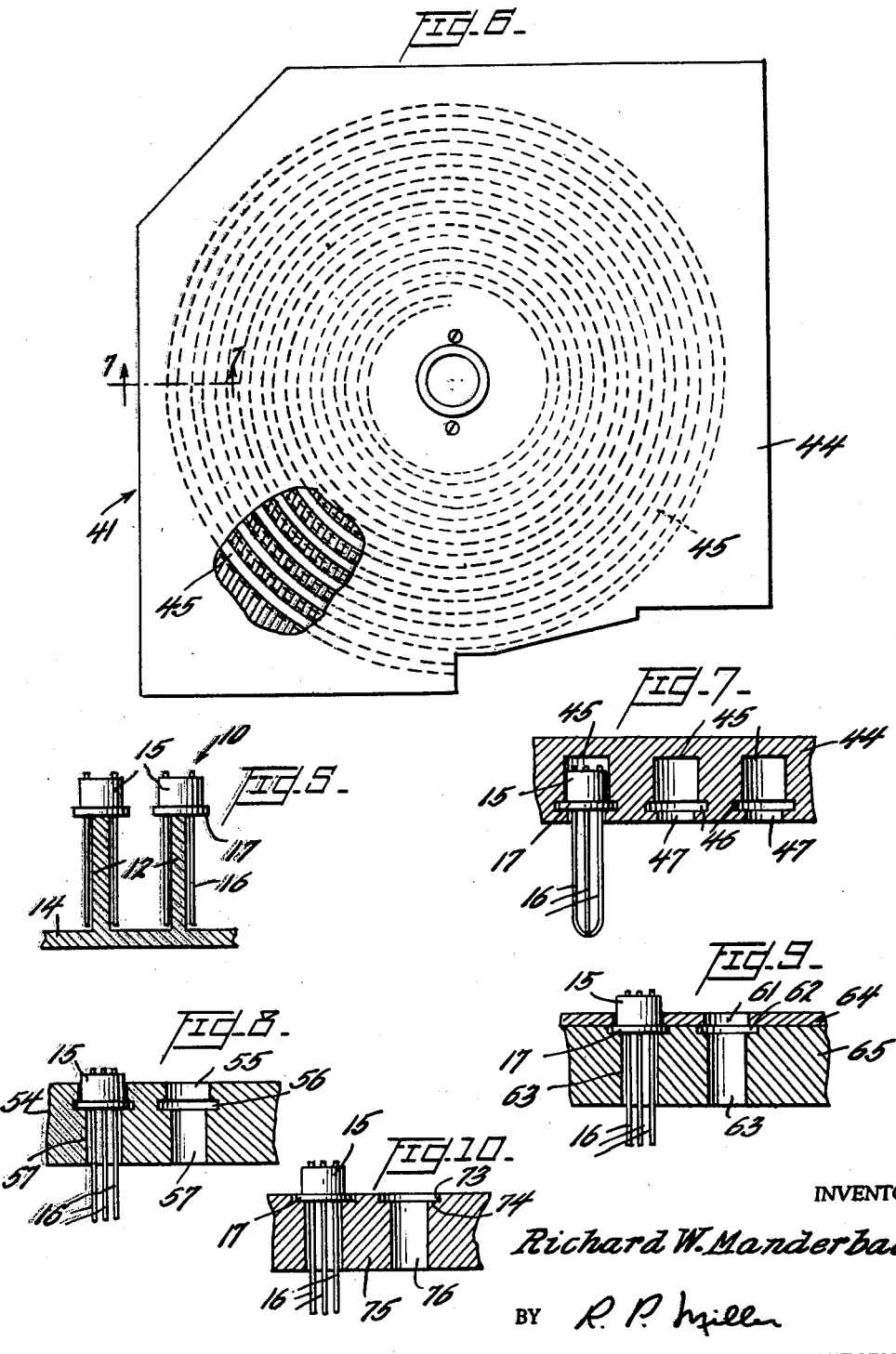

United States Patent Office 3,194,392
Patented July 13, 1965

3,194,392
VIBRATORY FEEDER AND STORAGE DEVICE
Richard W. Manderbach, Bethlehem, Pa., assignor to Western Electric Company, Incorporated, New York, N.Y., a corporation of New York
Filed Mar. 27, 1963, Ser. No. 268,410
8 Claims. (Cl. 198—220)

This invention relates to a vibratory feeder and storage device and more particularly to a device having a planar spiral path that may be vibrated in one manner to feed articles from the path and that may be vibrated in another manner to feed articles into the path.

In the prior art it has been customary to use very elaborate devices for feeding and storing articles comprising positioners, pushers, transfer mechanisms and other components. The instant device avoids the use of such components by providing a magazine which supports, maintains orientation, feeds, and transfers the articles from the magazine to a machine where a fabrication step is performed. The articles are then fed to a second magazine similar to the first which stores the articles in an oriented manner for subsequent operations.

It is an object of the present invention to provide a new and improved vibratory device for feeding and storing electrical components such as transistor headers, or other articles.

It is another object of the invention to provide a planar spiral vibratory device which can be used interchangeably for either feeding or storing large numbers of transistor headers.

It is still a further object of the invention to provide a planar spiral vibratory feeding and storage device which maintains the transistor headers in a predetermined oriented position to minimize the possibility of jamming of the headers.

It is another object of the invention to provide a magazine having a planar spiral path which is loaded with transistor headers and which has helical oscillatory motion imparted thereto to feed the headers along the path and out of the magazine.

It is a further object of the invention to provide a second magazine having a planar spiral path in which transistor headers can be reloaded by imparting helical oscillatory motion to the magazine.

With these and other objects in mind, the present invention contemplates a feeding apparatus comprising a plate having a horizontal planar spiral track to support a plurality of transistor headers therealong during feeding. The plate is supported on a platform of a conventional vibratory motor, such as that sold under the trademark "Syntron" and disclosed in the Syntron Company's catalog SM 7/1/59 P.O. #55801, page 9, for imparting helical oscillatory motion to the plate. During feeding from the plate, helical oscillation is imparted to the plate which will move the headers from the center of the plate toward an edge. When the plate is receiving articles for storage, helical oscillation in a reverse direction is imparted to the plate which causes the articles to move from an edge of the plate toward the center.

A feature of this invention is a work feeding and storage plate capable of simple removal from one work area and portable transport to another area.

Another feature of this invention is a work feeding and storage plate which is capable of feeding and maintaining the headers in oriented relationship within relatively small work and storage areas, respectively. For example, it is possible with a plate having a planar spiral dimension of approximately eight inch diameter and a 3/16 inch track width to accommodate the same number of headers thereon as a linear track having a length of approximately 10½ feet.

Other objects and advantages of the invention will become apparent upon consideration of the following detailed description, in conjunction with the accompanying drawings, in which:

FIG. 1 is a perspective view of an electrical component such as a transistor header that may be fed and stored by the apparatus of the present invention;

FIG. 2 is a plan view showing a vibratory bowl feeding headers to a straight vibratory track to initially load a magazine comprised of a plate having a planar spiral track and embodying the principles of the present invention;

FIG. 3 is a plan view of a loaded magazine feeding headers to a machine from which the headers are then fed into a second magazine for storage;

FIG. 4 is a side elevation of the apparatus showing the vibratory motors and their associated platforms for supporting the feeding and storage magazines;

FIG. 5 is a fragmentary sectional view taken along line 5—5 of FIG. 3 showing the headers supported on the planar spiral strip track;

FIG. 6 is a plan view of a second embodiment of the invention in which the plate of the magazine has a planar spiral groove for supporting the headers;

FIG. 7 is a fragmentary sectional view of the magazine taken on line 7—7 of FIG. 6 and particularly showing the configuration of the planar spiral groove;

FIG. 8 is a fragmentary sectional view of a magazine showing a third configuration of a planar spiral groove having a keyway and an open top;

FIG. 9 is a fragmentary sectional view of a magazine showing a fourth configuration of a planar spiral groove fabricated from a plurality of plates; and FIG. 10 is a fragmentary sectional view of a magazine showing a fifth configuration of a planar spiral groove having an open top.

Referring to the drawings and in particular to FIG. 1, there is shown an electrical component such as a transistor header 10 having a head 15, a flange portion 17, and at least a pair of depending terminals 16. Transistor headers of this type may be fed and stored by the device comprising the instant invention although it is to be understood that this transistor header is only used as an example and that other articles can be fed and stored by the device.

Referring to FIG. 2, there is shown a vibratory bowl 31 of conventional design for receiving randomly arranged headers in the central or bottom bowl portion 35 of the apparatus. Upon subjection of the bowl 31 to vibratory motion, the headers are fed upwardly on a spiral path 32 connected to the inner peripheral surface of the bowl in a well known manner to a straight section 34 of the apparatus. At this point, the headers are vertically oriented in a line along section 34 and are transferred to an adjoining straight vibratory track 33 which is vibrated by a vibratory motor, not shown, to feed the headers to a magazine 11. Magazine 11 is vibrated in such a manner that the headers move along a planar spiral path toward the center of the magazine to fill the magazine.

Referring now to FIG. 3, there is shown a loaded magazine 11 which feeds transistor headers 10 to a straight vibratory track 18 which feeds the headers to a machine 20 where a fabrication step is performed on the headers. The headers are then fed from the machine 20 along a straight vibratory track 27 to a storage magazine 21. Magazine 11 is comprised of a metal plate 14 which is generally square in shape but which has a right angle notched portion to provide an edge 19. Plate 14 has a strip or track 12 formed in the shape of a planar spiral and attached thereto by welding, riveting or some other suitable means. The planar spiral strip 12 has one end located in the central portion of plate 14 and the other end of the strip terminates at the edge 19 of the plate, the end of the strip being perpendicular to said edge. The upper surface of strip 12, see FIG. 5, supports the headers on the under side of head 15 with the terminals 16 straddling the strip 12 to prevent the headers from falling off. Magazine 21 is a duplicate of magazine 11 except that, the helical oscillation imparted thereto is the reverse of that imparted to magazine 11. Magazine 21 is comprised of a plate 24 having a notched portion to provide an edge 29. Plate 24 has a strip 22 attached thereto which has one end in the central portion of plate 24 and the other end terminates perpendicular to the edge 29 adjoining the straight vibratory track 27.

As seen in FIG. 4, magazine 11 is provided with a sleeve 36 which is insertable over a shaft 13 having one end connected to a platform 37. The bottom end of sleeve 36 rests upon the platform 37, while the top end serves as a stop for a nut 28 which is threadedly connected to the other end of the shaft 13 to secure the magazine 11 to the platform 37. The platform 37 is connected to a conventional vibratory motor 25 which imparts helical oscillatory motion to the magazine 11, that is, the magazine 11 is oscillated about its vertical axis and at the same time is reciprocated vertically. In the case of magazine 11, an initial combined downward and clockwise movement causes the headers to be momentarily suspended off the track. This is followed by an upward motion which is accompanied by a counterclockwise movement in the same direction as the planar spiral path unfolds from the center of plate 14. During this combined upward and counterclockwise movement, the headers regain contact with the planar spiral path and are advanced upwardly and arcuately in a counterclockwise direction to an advanced position from their preceding rest position in the magazine. The magazine 11 having returned to its initial position is now ready to again move in a downward clockwise direction to suspend the headers after which an upward, counterclockwise movement advances the headers further around the planar spiral path in a similar manner. It should be noted that the distance advanced by the headers during each cycle is a function, among other things, of the mass of the headers, and the amplitude of the oscillatory motion imparted to the magazine. It is to be understood that these motions are occurring very rapidly and would not be discernible by the eye.

The movement of magazine 21, which is similarly provided with a sleeve 39 which is supported on a shaft 23 and platform 38 of a vibratory motor 26, is the reverse of magazine 11. The direction of the feed of the headers in the magazines 11 and 21 is determined by the manner in which the platforms 37 and 38 are vibrated. This, in turn, is determined by the position of bar springs (not shown) which are mounted beneath the platforms 37 and 38 as is conventional in "Syntron" vibratory motors. Since it is desired to feed headers 10 in a clockwise direction on the spiral path as it folds into the center, initially the magazine is moved downwardly and rotated in a counterclockwise direction. A return movement in a clockwise direction accompanied by an upward movement results in the headers 10 dropping on the magazine 21 at advanced positions. Thus the headers move toward the center of the plate 24 in a clockwise manner during reloading of the magazine 21.

In operation helical oscillations are imparted to magazine 11 by the vibratory motor 25 to feed headers 10 supported on the planar spiral strip 12 from the center of plate 14 to edge 19 of the plate. Adjoining the end of the strip 12 at the edge 19 of the plate is a straight vibratory track 18 which is vibrated by a motor, not shown. Track 18 feeds headers 10 to a machine 20 at which an operation is performed on the headers. From machine 20 the headers are fed to another straight vibratory track 27 which is vibrated by a motor, not shown, to feed the headers to the edge portion 29 of a second plate 24 having a planar spiral strip 22 attached thereto. The operation of magazine 21 in reloading the headers is similar to that of magazine 11 except that a reverse helical oscillatory movement is imparted ot the latter by the vibratory motor 26. After magazine 11 has been unloaded, it can be easily removed to another machine and used as a storage device such as magazine 21 is used in FIG. 3. In the same sense, when magazine 21 has been loaded with headers as shown in FIG. 3, it can be removed to a second machine and used to feed headers to the machine as magazine 11 does in FIG. 3. Thus, it can be seen that the magazines are interchanegable as feeding and as storage devices.

In some cases it is not feasible to have the transistor header 10 straddle a strip 12, as, for example, when the ends of the terminals are connected together. In such cases, a modified magazine, such as that shown in FIGS. 6 and 7, is used. In this embodiment, the magazine 41 comprises a plate 44 in which a groove is machined in the form of a planar spiral path for supporting and guiding the headers. The groove is closed at the top to provide a cavity 45 with sufficient clearance for receiving the head 15 of the header to prevent jamming and is sufficiently wide to allow free passage of the head. The bottom of the groove is open as shown at 47 to allow the terminals 16 to hang freely. Between the top and bottom portions of the groove is a keyway 46 comprising a pair of slots running along opposite walls of the groove. The slots of the keyway 46 serve to support and guide the opposite sides of the flange 17 of the header as the header is fed along the planar spiral path of the groove. The provision of keyway 46 alleviates jamming and piling up of the headers because the headers are constrained about the flanges. In this embodiment, as in all embodiments, magazine 41 is initially loaded from the vibratory bowl 31 as is described with reference to FIG. 2. Magazine 41 is then used in the same manner as is described with reference to magazine 11.

In FIG. 8, there is shown a third embodiment in which the magazine is fabricated from a single plate 54 to form a planar spiral groove having a configuration of a cruciform. In this embodiment, the groove is open at the top and bottom at 55 and 57, respectively, for receiving the head 15 and terminals 16 therein. A grooved keyway 56 is provided with slots on opposite lateral sides of the grooved path for receiving the header flange which in turn permits the header to be supported and guided through the spiral groove.

In FIG. 9, there is shown a fourth embodiment which is fabricated from two plates 64 and 65 which are secured together by welding, riveting or some other suitable means. This enables a simplified fabrication. This magazine functions similar to the magazine shown in FIG. 8. In this embodiment plate 64 is provided with a planar spiral opening 61 through which the head 15 of the header 10 is free to pass. Plate 65 is provided with a planar spiral shelf 62 which forms a keyway with plate 64 similar to that shown in FIG. 7 as element 46. Plate 65 also has a planar spiral opening 63 through which the terminals 16 are free to hang.

In FIG. 10, there is shown a fifth embodiment which is fabricated from a single plate 75 in which the head portion 15 of the header is free to extend upwardly in an opening 73. The flange 17 of the header is supported on a planar spiral shelf 74 with the terminals 16 free to hang down through a planar spiral groove 76.

It is to be understood that the above-described arrangements of apparatus and construction of elemental parts are simply illustrative of an application of the principles of the invention, and many other modifications may be made without departing from the invention.

What is claimed is:
1. In an article feed device,
a flat plate having a planar spiral passageway terminating at a first end near the center of the plate and ter- minating at the other end in a vertical edge of the plate, said passageway extending partially through the cross-section of the plate opening into the bottom face thereof, and having a keyway for supporting and orienting articles in a depending manner through the opening, a vertical support shaft attached to one face of the plate, and means for imparting helical oscillatory forces to said shaft wherein a downward force component is accompanied by a rotative component of force in a direction opposite to the direction that the planar spiral unfolds from the center of the plate to suspend momentarily the articles, and a reverse motion of an upward force component accompanied by a rotative component in the direction that the planar spiral unfolds from the center whereupon the suspended articles drop into the passageway in an advanced position.

2. In an article feed and storage apparatus, a first plate having a first planar spiral passageway extending from the center of the plate to an edge of the plate for holding a supply of articles, means for supporting and imparting helical oscillatory forces to said first plate to feed articles from said first spiral passageway, a second plate having a second planar spiral passageway extending from an edge of the plate toward the center of the plate for receiving the supply of articles, means for transferring articles emanating from the first spiral passageway to the second spiral passageway, and means for supporting and imparting helical oscillatory forces to said second plate to feed the articles into said second spiral passageway.

3. In an article feeding and storage apparatus according to claim 2 having means for removably securing the first and second plates to the supporting and imparting means to facilitate a portable transfer of the plates between the respective supporting and imparting means.

4. In a magazine for feeding articles in a single plane, said articles having a head, a flanged portion, and depending terminals attached to the flange, comprising a plate positioned in a horizontal plane, said plate having a groove extending from the central portion of the plate to an outer terminus at an edge of the plate, said groove following a path in the shape of a spiral from the central portion to the edge, and said groove having a cross section in the shape of a cruciform, said cruciform having a transverse keyway to support the flanged portion, a cavity for receiving the head, and a bottom opening through which the terminals hang freely, and means for imparting helical oscillatory motion to the plate to move the articles along the groove in the horizontal plane to the edge of the plate.

5. In a magazine for feeding articles as defined in claim 4 wherein the plate has a right-angle notch to provide an edge at the outer terminus of the groove.

6. In a device for feeding articles in a single plane, said articles having a head, a flanged portion, and depending terminals attached to the flange comprising, a plate positioned in a horizontal plane, said plate having a groove extending from the central portion of the plate to an edge thereof, said groove following a planar spiral path from the central portion to the edge, and said groove having a cross section in the shape of a cruciform, the cruciform having a transverse keyway to support the flanged portion, a top opening to allow free movement of the head, and a bottom opening through which the terminals hang freely, and means for imparting helical oscillatory motion to the plate to move the articles along the groove in the horizontal plane of the plate to the edge.

7. In an article feeding and storage device, comprising:

a first plate having a first planar spiral passageway extending from the center of the plate to a vertical edge of the plate for holding a supply of articles, a second plate spaced from the first plate having a second planar spiral passageway and a second vertical edge of substantially the same configuration as said first passageway and edge for receiving the supply of articles, a first vibratory means for supporting and imparting vibrations to the first plate to feed articles toward the first vertical edge, means aligned with the first vertical edge for transferring articles from the first edge to the second edge, and a second vibratory means for supporting and imparting vibrations to the second plate in a direction opposite to said first vibratory means to feed the articles from the second vertical edge into said second spiral passageway.

8. In an article feeding and storage device, said articles having a head, a flanged portion, and depending terminals attached to the flange, comprising:

a first plate having a first planar spiral passageway extending from the center of the plate to a vertical edge of the plate for holding a supply of articles, means for supporting and imparting vibratory forces to said first plate to feed articles from said first spiral passageway, a second plate having a second planar spiral passageway extending from a vertical edge of the plate toward the center of the plate for receiving the supply of articles, said first and second spiral passageways having cross-sections of generally cruciform configuration for supporting and constraining the articles about the flanged portion and for allowing the depending terminals to hang freely, means aligned with the vertical edges of the first and second plates for transferring articles emanating from the first spiral passageway to the second spiral passageway, and means for supporting and imparting vibratory forces to said second plate to feed the articles into said second spiral passageway.

References Cited by the Examiner

FOREIGN PATENTS 348,367   2/19   Germany.
127,560   12/60  U.S.S.R.

SAMUEL F. COLEMAN, Primary Examiner.

EDWARD A. SROKA, Examiner.